United States Patent
McCaffrey

(10) Patent No.: US 10,443,424 B2
(45) Date of Patent: Oct. 15, 2019

(54) TURBINE ENGINE BLADE OUTER AIR SEAL WITH LOAD-TRANSMITTING CARRIAGE

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 783 days.

(21) Appl. No.: 15/071,291

(22) Filed: Mar. 16, 2016

(65) Prior Publication Data

US 2017/0268363 A1  Sep. 21, 2017

(51) Int. Cl.
 *F01D 11/08* (2006.01)
 *F01D 9/04* (2006.01)
 *F01D 25/24* (2006.01)

(52) U.S. Cl.
 CPC .............. *F01D 11/08* (2013.01); *F01D 9/041* (2013.01); *F01D 25/243* (2013.01); *F01D 25/246* (2013.01); *F05D 2220/32* (2013.01); *F05D 2240/11* (2013.01); *F05D 2240/55* (2013.01); *F05D 2260/30* (2013.01); *F05D 2300/131* (2013.01); *F05D 2300/20* (2013.01)

(58) Field of Classification Search
 None
 See application file for complete search history.

(56) References Cited

U.S. PATENT DOCUMENTS

| | | | |
|---|---|---|---|
| 4,087,199 A | 5/1978 | Hemsworth et al. | |
| 4,157,232 A * | 6/1979 | Bobo | F01D 11/08 415/116 |
| 4,527,385 A | 7/1985 | Jumelle et al. | |
| 4,728,257 A | 3/1988 | Handschuh | |
| 5,609,469 A | 3/1997 | Worley et al. | |
| 5,639,210 A | 6/1997 | Carpenter et al. | |
| 6,142,731 A | 11/2000 | Dewis et al. | |
| 6,431,825 B1 | 8/2002 | McLean | |
| 6,726,448 B2 | 4/2004 | McGrath et al. | |
| 6,733,235 B2 | 5/2004 | Alford et al. | |
| 7,052,235 B2 | 5/2006 | Alford et al. | |
| 7,163,206 B2 | 1/2007 | Cross et al. | |

(Continued)

FOREIGN PATENT DOCUMENTS

| | | |
|---|---|---|
| EP | 1749978 | 2/2007 |
| EP | 1762705 | 3/2007 |

(Continued)

OTHER PUBLICATIONS

Extended European Search Report for European Patent Application No. 17160084.4 completed Jul. 14, 2017.

*Primary Examiner* — Kayla Mccaffrey

(74) *Attorney, Agent, or Firm* — Carlson, Gaskey & Olds, P.C.

(57) ABSTRACT

A gas turbine engine includes a case disposed around a central axis, a vane structure disposed radially inwards of the case, a seal carriage mounted to the case, and a seal arc segment mounted to the seal carriage. The vane structure exerts an axial load on the seal carriage. The seal carriage defines a load path that radially transmits the axial load to the case.

23 Claims, 3 Drawing Sheets

(56) References Cited

U.S. PATENT DOCUMENTS

| | | | |
|---|---|---|---|
| 7,435,049 B2 | 10/2008 | Ghasripoor et al. | |
| 7,527,472 B2 | 5/2009 | Allen | |
| 7,959,407 B2 | 6/2011 | Tholen | |
| 8,123,466 B2 | 2/2012 | Pietraszkiewicz et al. | |
| 8,303,247 B2 | 11/2012 | Schlichting et al. | |
| 8,403,636 B2* | 3/2013 | Dakowski | F01D 9/04 415/173.1 |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 2006/0038358 A1 | 2/2006 | James | |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1* | 2/2011 | DiPaola | F01D 9/04 415/173.1 |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2014/0341707 A1* | 11/2014 | Jones | F01D 11/24 415/1 |
| 2015/0016954 A1 | 1/2015 | Thibodeau et al. | |
| 2015/0031764 A1 | 1/2015 | Kraus et al. | |
| 2015/0226132 A1 | 8/2015 | Roy Thill et al. | |
| 2015/0337672 A1 | 11/2015 | McCaffrey et al. | |
| 2015/0369076 A1 | 12/2015 | McCaffrey et al. | |
| 2015/0377035 A1* | 12/2015 | Freeman | F01D 11/12 416/191 |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| WO | 2015038341 | 3/2015 |
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

TURBINE ENGINE BLADE OUTER AIR SEAL WITH LOAD-TRANSMITTING CARRIAGE

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A gas turbine engine according to an example of the present disclosure includes a case disposed around a central axis, a vane structure disposed radially inwards of the case, and a seal carriage mounted to the case. The seal carriage defines a load path and a seal arc segment mounted to the seal carriage. The vane structure exerts an axial load on the seal carriage, and the load path radially transmits the axial load to the case.

In a further embodiment of any of the foregoing embodiments, the seal arc segment is off the load path.

In a further embodiment of any of the foregoing embodiments, the seal carriage includes a radially-extending wall that defines an axial face, and the axial face abuts the vane structure.

In a further embodiment of any of the foregoing embodiments, the seal carriage includes an axially-extending wall joined with the radially-extending wall, and the radially-extending wall tapers from the axially-extending wall.

In a further embodiment of any of the foregoing embodiments, at least a portion of the axially-extending wall includes an incline that extends radially outwardly.

In a further embodiment of any of the foregoing embodiments, an end of the incline distal from the radially extending wall includes a first hook member that is connected to the case.

In a further embodiment of any of the foregoing embodiments, the axially-extending wall includes a second hook member proximal to the radially-extending wall, and the second hook member is also connected to the case.

In a further embodiment of any of the foregoing embodiments, the load path is through the radially-extending wall, the axially-extending wall, the incline, the first hook member, and the second hook member.

In a further embodiment of any of the foregoing embodiments, the seal arc segment defines first and second seal supports, and the seal carriage defines first and second support members that are circumferentially spaced apart from each other. The first support member supports the seal arc segment in a first ramped interface and the second support member supporting the seal arc segment in a second ramped interface such that the seal arc segment is circumferentially moveable with respect to the carriage.

In a further embodiment of any of the foregoing embodiments, the first and second support members are off the load path.

In a further embodiment of any of the foregoing embodiments, the seal carriage includes first and second hook members connected to the case, and the first and second hook members are axially spaced apart from each other.

In a further embodiment of any of the foregoing embodiments, the seal arc segment includes at least one of a ceramic material or a molybdenum-based alloy.

A gas turbine engine according to an example of the present disclosure includes a case disposed around a central axis, a vane structure disposed radially inwards of the case, and a seal carriage axially adjacent the vane structure and transmitting a load from the vane structure to the case. The seal carriage includes first and second hook members mounting the seal carriage to the case. The first and second hook members are axially spaced apart from each other, first and second seal support members that are circumferentially spaced apart from each other, and a seal arc segment includes first and second seal supports. The first seal support member supports the seal arc segment via the first seal support and the second seal support member supports the seal arc segment via the second seal support.

In a further embodiment of any of the foregoing embodiments, the first seal support member supports the seal arc segment via the first seal support in a first ramped interface, and the second seal support member supports the seal arc segment via the second seal support in a second ramped interface.

In a further embodiment of any of the foregoing embodiments, the seal carriage includes a radially-extending wall that defines an axial face, and the axial face abuts the vane structure.

In a further embodiment of any of the foregoing embodiments, the seal carriage includes an axially-extending wall joined with the radially-extending wall, and the radially-extending wall tapers from the axially-extending wall.

In a further embodiment of any of the foregoing embodiments, at least a portion of the axially-extending wall includes an incline that extends radially outwardly to the first hook member.

In a further embodiment of any of the foregoing embodiments, the seal arc segment includes at least one of a ceramic material or a molybdenum-based alloy.

A gas turbine engine according to an example of the present disclosure includes a case disposed around a central axis, a vane structure disposed radially inwards of the case, and a seal carriage axially adjacent the vane structure. The case and the vane structure clamps the seal carriage in a fixed position. The seal carriage includes first and second hook members mounting the seal carriage to the case. The first and second hook members are axially spaced apart from each other, and first and second seal support members that are circumferentially spaced apart from each other; and a seal arc segment including first and second seal supports. The first seal support member supports the seal arc segment via the first seal support and the second seal support member supports the seal arc segment via the second seal support.

The gas turbine engine as recited in claim 19, wherein the clamping of the seal carriage in the fixed position secures the seal carriage in a radial direction and an axial direction.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figures 1, 2, 3:
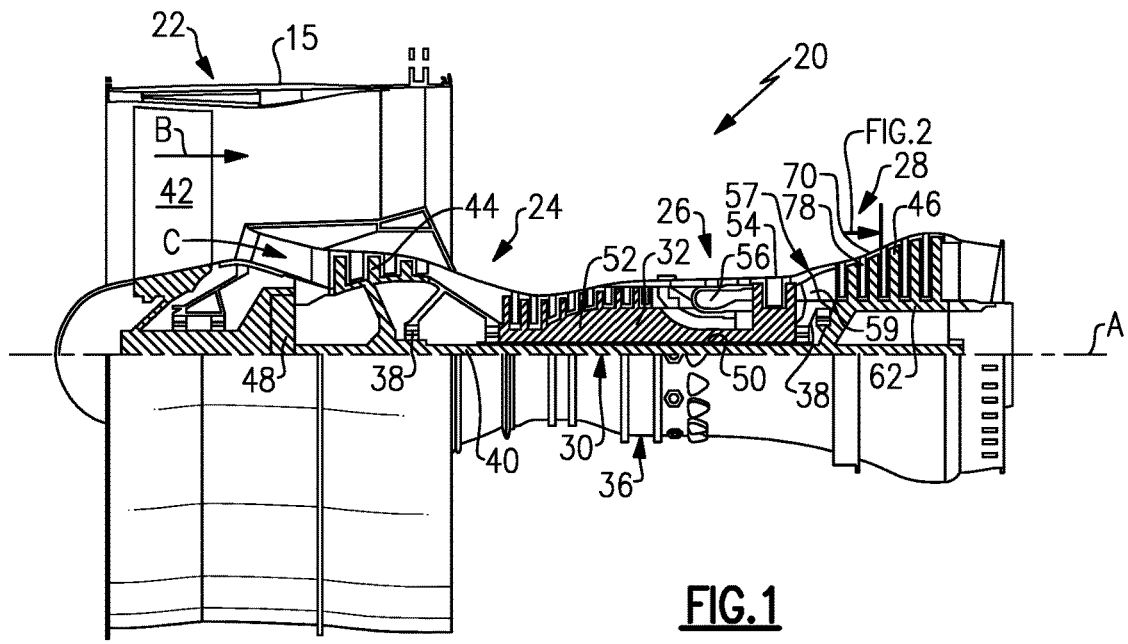
FIG. 1 illustrates a gas turbine engine.
FIG. 2 illustrates an axial view of an example of a blade outer air seal of a gas turbine engine.
FIG. 3 illustrates an isolated view of an example of a seal arc segment of a blade outer air seal.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. As can be appreciated, the BOAS 60 can alternatively or additionally be adapted for other portions of the engine 20, such as the compressor section 24.

The BOAS 60 includes a plurality of seal arc segments 66 that are circumferentially arranged in an annulus around the central axis A of the engine 20. The seal arc segments 66 are mounted in a carriage 68, which may be continuous or segmented. The carriage 68 is mounted through one or more connections 69 to a case 70, which is disposed around the engine central longitudinal axis A. The BOAS 60 is in close radial proximity to the tips of the blades 64, to reduce the amount of gas flow that escapes around the blades 64.

Figure 4:
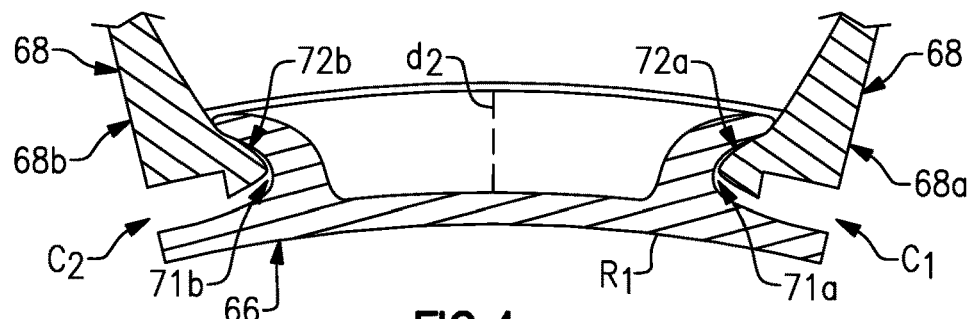
FIG. 4 illustrates a sectioned view of an example of a seal arc segment mounted in a carriage.

FIG. 3 illustrates an isolated view of a representative one of the seal arc segments 66, and FIG. 4 illustrates a radially sectioned view of the seal arc segment 66 mounted in a portion of the carriage 68. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, circumferentially spaced-apart first and second seal supports 71*a*/71*b* by which the carriage 68 radially supports or suspends the seal arc segment 66. The seal arc segment 66 is thus end-mounted. In the example shown, the first and second seal supports 71*a*/71*b* have a dovetail geometry.

The carriage 68 includes circumferentially spaced-apart first and second support members 68*a*/68*b* that serve to radially support the seal arc segment 66 via, respectively, the first and second seal supports 71*a*/71*b*. In the example shown, the first and second support members 68*a*/68*b* are hook supports that interfit with the dovetail geometry of the first and second seal supports 71*a*/71*b*.

The first support member 68*a* supports the seal arc segment 66 in a first ramped interface 72*a* and the second support member 68*b* supports the seal arc segment 66 in a second ramped interface 72*b*. For instance, each of the ramped interfaces 72*a*/72*b* includes at least one ramped surface on the seal arc segment 66, the carriage 68, or both. In the example shown, the surfaces of the first and second seal supports 71*a*/71*b* and the surfaces of the first and second support members 68*a*/68*b* are ramped. The term "ramped" as used herein refers to a support surface that is sloped with respect to both the radial and circumferential directions.

The ramped interfaces 72*a*/72*b* permit the seal arc segment 66 to move circumferentially with respect to the carriage 68 as the seal arc segment 66 slides up and down the ramped interfaces 72*a*/72*b*. Friction in the ramped interfaces 72*a*/72*b* during sliding movement can potentially provide damping, and the relatively large contact area across the ramped interfaces 72*a*/72*b* distributes loads transferred through the ramped interfaces 72*a*/72*b*, which also serves to potentially reduce stress concentrations on the seal arc segment 66.

In this example, the radially outer side R2 of the seal arc segment 66 includes radially-extending rails or sidewalls 74 (FIG. 3) that define a pocket 76 on the radially outer side R2 of the seal arc segment 66. The pocket 76 is open on its radially outer side. The pocket 76 serves to reduce the mass of the seal arc segment 66 and may be used to facilitate cooling of the seal arc segment 66. As can be appreciated given this disclosure, the geometry of the pocket 76 may be varied and may include ribs or other structures related to cooling and/or position control of the seal arc segment 66.

Figure 5:
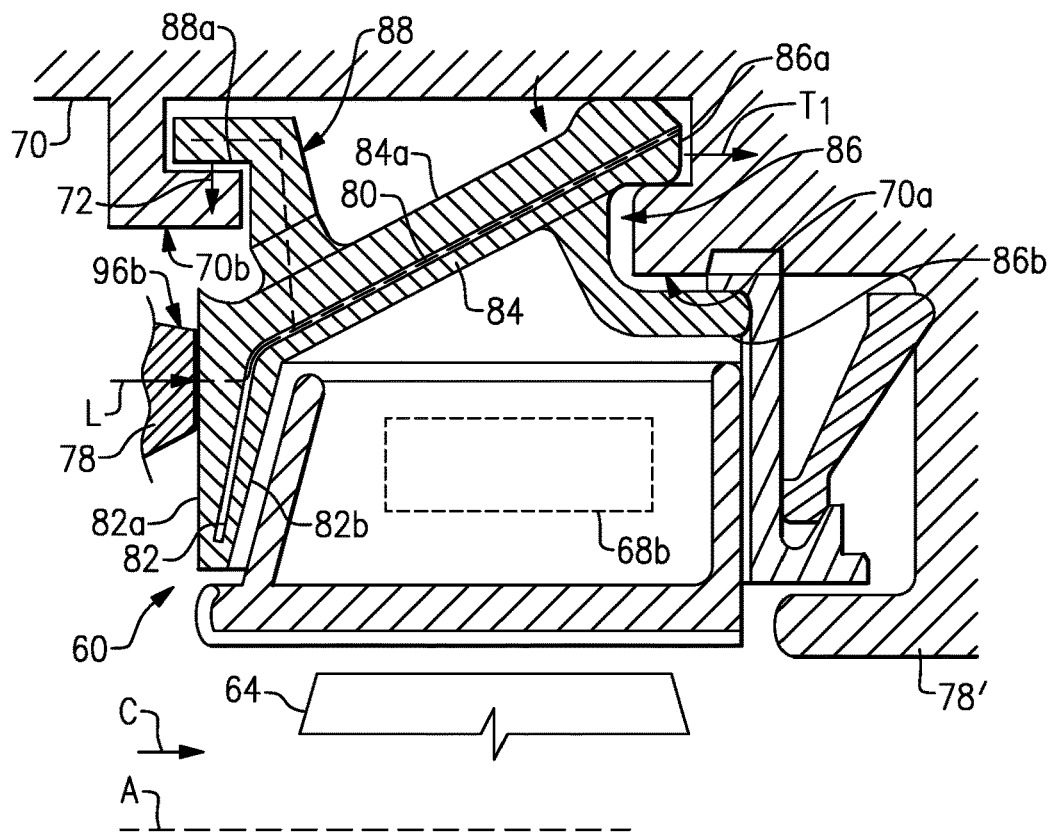
FIG. 5 illustrates a sectioned view of an example of a blade outer air seal mounted to a case.
Figure 6:
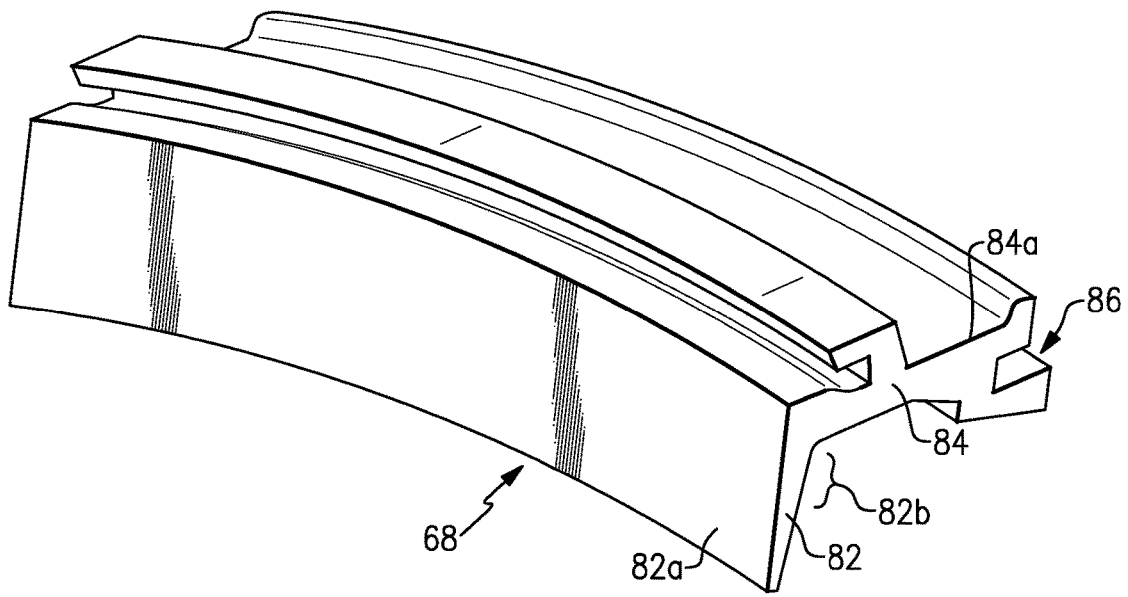
FIG. 6 illustrates an isolated view of an example seal carriage.
Figure 7:
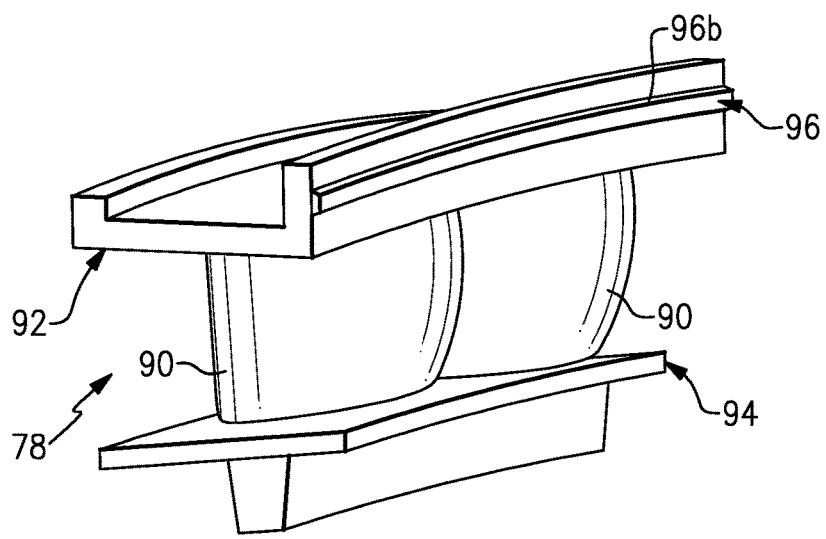
FIG. 7 illustrates an isolated view of an example vane structure.

FIG. 5 shows the BOAS 60 and case 70 sectioned along a radial plane that contains the engine central longitudinal axis A; FIG. 6 shows an isolated view of a representative portion of the carriage 68; and FIG. 7 shows an isolated view of a vane structure 78 that is disposed radially inwards of the case 70 adjacent to the BOAS 60.

The carriage 68 is mounted to the case 70 and defines a load path, generally shown at 80. As will be described in more detail below, the vane structure 78 exerts an axial load (L) on the carriage 68, and carriage 68 radially transmits the axial load, via the load path 80, around the seal arc segment 66 to the case 70. The case 70 and the vane structure 78 thus clamp the carriage 68 in a fixed position. For instance, the clamping secures the carriage 68 in the radial and axial directions. The seal arc segment 66 and the first and second support members 68*a*/68*b* of the carriage 68 are off the load path 80. Thus, the axial load is not transmitted through the seal arc segment 66. The carriage 68 thus provides an isolation cavity for low-stress mounting of the seal arc segment 66.

In order to transmit the axial load (L) the carriage 68 includes a radially-extending wall 82 that defines an axial face 82*a*, and an axially-extending wall 84 that joins with the radially-extending wall 82. In this example, the radially-extending wall 82 tapers at 82*b* from the axially-extending wall 84. The taper provides a relatively thicker wall portion at the juncture with the axially-extending wall 84 to facilitate load transmittance and reduce wall deflection.

At least a portion of the axially-extending wall 84 includes an incline 84*a* that extends radially outwardly. The incline 84*a* includes an end, designated at E, which is distal from the radially-extending wall 82. The end includes a first hook member 86 that is connected to the case 70. For instance, the case 70 includes a corresponding first hook member 70*a* that interfits with the hook member 86 to support the carriage 68. In this example, the hook member 86 includes radially spaced-apart arms 86*a*/86*b*, and the hook member 70*a* is received radially between the arms 86*a*/86*b*.

The axially-extending wall 84 also includes a second hook member 88 that is proximal to the radially-extending wall 82. The first and second hook members 86/88 are axially spaced apart from each other. The second hook member 88 is also connected to the case 70. For instance, the case 70 includes a corresponding second hook member 70*b* that interfits with the hook member 88 to support the carriage 68. In this example, the hook member 88 includes a single arm 88*a* that axially overlaps the hook member 70*b* of the case 70.

Turning to the vane structure 78, in this example the structure 78 is a vane doublet that includes two vane airfoils

90. The airfoils 90 extend radially between outer and inner platforms 92/94. The outer platform 92 includes a radially-extending wall 96 that defines an axial face 96a. The axial face 96a includes a chordal seal 96b.

As shown in FIG. 5, the chordal seal 96b abuts the axial face 82a of the carriage 68. The vane structure 78 exerts the axial load L on the carriage 68 via the chordal seal 96b. Such a load exerted on the radially-extending wall 82 of the carriage 68 has the tendency to circumferentially twist and radially and axially bend the carriage 68 if not properly reacted into the case 70. In this regard, the carriage 68 transmits the load via the load path 80 through the radially-extending wall 82, the axially-extending wall 84, the incline 84a, the first hook member 86, and the second hook member 88 into the case 70. Moreover, since the seal arc segment 66 and the first and second support members 68a/68b of the carriage 68 are off the load path 80, the stresses on the seal arc segment 66 and the first and second support members 68a/68b due to the axial load from the vane structure 78 are reduced.

The geometry of the carriage 68 facilitates such a load path 80. For instance, the taper of the radially-extending wall 82 from the axially-extending wall 84 facilitates a reduction in deflection of the radially-extending wall, which otherwise has the potential to load the seal arc segment 66. Additionally, the slope of the incline 84a facilitates transmittance of the axial load (L) from the vane structure 78 to the radially outward location of the case 70. For instance, a portion of the load is transmitted at T1 through the first hook member 86 into the case 70. The first hook member 86 is mechanically coupled with the second hook member 88 such that a portion of the load is also transmitted at T2 through the second hook member 88 into the case 70. Such a balance of load transmittance into the case 70 facilities maintaining the carriage 68, and thus the seal arc segment 66, in a proper position. In addition to avoiding loading of the seal arc segment 66, the transmittance of the axial load from the vane structure 78 in this manner also facilitates the reduction of load transmittance to the next adjacent downstream vane structure 78'.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
a case disposed around a central axis;
a vane structure disposed radially inwards of the case;
a seal carriage mounted to the case, the seal carriage defining a load path; and
a seal arc segment mounted to the seal carriage,
wherein the vane structure exerts an axial load on the seal carriage, and the load path radially transmits the axial load to the case, and
wherein the seal arc segment defines first and second seal supports and the seal carriage defines first and second support members that are circumferentially spaced apart from each other, the first support member supporting the seal ar segment in a first ramped interface and the second support member supporting the seal arc segment in a second ramped interface such that the seal arc segment is circumferentially moveable with respect to the carriage.

2. The gas turbine engine as recited in claim 1, wherein the seal arc segment is off the load path.

3. The gas turbine engine as recited in claim 1, wherein the seal carriage includes a radially-extending wall that defines an axial face, and the axial face abuts the vane structure.

4. The gas turbine engine as recited in claim 3, wherein the seal carriage includes an axially-extending wall joined with the radially-extending wall, and the radially-extending wall tapers from the axially-extending wall.

5. The gas turbine engine as recited in claim 4, wherein at least a portion of the axially-extending wall includes an incline that extends radially outwardly.

6. The gas turbine engine as recited in claim 5, wherein an end of the incline distal from the radially extending wall includes a first hook member that is connected to the case.

7. The gas turbine engine as recited in claim 6, wherein the axially-extending wall includes a second hook member proximal to the radially-extending wall, and the second hook member is also connected to the case.

8. The gas turbine engine as recited in claim 7, wherein the load path is through the radially-extending wall, the axially-extending wall, the incline, the first hook member, and the second hook member.

9. The gas turbine engine as recited in claim 1, wherein the first and second support members are off the load path.

10. The gas turbine engine as recited in claim 1, wherein the seal carriage includes first and second hook members connected to the case, and the first and second hook members are axially spaced apart from each other.

11. The gas turbine engine as recited in claim 1, wherein the seal arc segment includes at least one of a ceramic material or a molybdenum-based alloy.

12. A gas turbine engine comprising:
a case disposed around a central axis;
a vane structure disposed radially inwards of the case;
a seal carriage axially adjacent the vane structure and transmitting a load from the vane structure to the case, the seal carriage including,
first and second hook members mounting the seal carriage to the case, the first and second hook members being axially spaced apart from each other, and
first and second seal support members that are circumferentially spaced apart from each other; and
a seal arc segment including first and second seal supports,
wherein the first seal support member supports the seal arc segment via the first seal support and the second seal support member supports the seal arc segment via the second seal support, and
wherein the first seal support member supports the seal arc segment via the first seal support in a first ramped interface, and the second seal support member supports the seal arc segment via the second seal support in a second ramped interface.

13. The gas turbine engine as recited in claim 12, wherein the seal carriage includes a radially-extending wall that defines an axial face, and the axial face abuts the vane structure.

14. The gas turbine engine as recited in claim 13, wherein the seal carriage includes an axially-extending wall joined with the radially-extending wall, and the radially-extending wall tapers from the axially-extending wall.

15. The gas turbine engine as recited in claim 14, wherein at least a portion of the axially-extending wall includes an incline that extends radially outwardly to the first hook member.

16. The gas turbine engine as recited in claim 12, wherein the seal arc segment includes at least one of a ceramic material or a molybdenum-based alloy.

17. A gas turbine engine comprising:
a case disposed around a central axis;
a vane structure disposed radially inwards of the case;
a seal carriage axially adjacent the vane structure, the case and the vane structure clamping the seal carriage in a fixed position, the seal carriage including,
   first and second hook members mounting the seal carriage to the case, the first and second hook members being axially spaced apart from each other, and
   first and second seal support members that are circumferentially spaced apart from each other; and
a seal arc segment including first and second seal supports,
wherein the first seal support member supports the seal arc segment via the first seal support and the second seal support member supports the seal arc segment via the second seal support, and
wherein the first seal support member supports the seal arc segment via the first seal support in a first ramped interface, and the second seal support member supports the seal arc segment via the second seal support in a second ramped interface.

18. The gas turbine engine as recited in claim 17, wherein the clamping of the seal carriage in the fixed position secures the seal carriage in a radial direction and an axial direction.

19. A gas turbine engine comprising:
a case disposed around a central axis;
a vane structure disposed radially inwards of the case;
a seal carriage mounted to the case, the seal carriage defining a load path; and
a seal arc segment mounted to the seal carriage,
wherein the vane structure exerts an axial load on the seal carriage, and the load path radially transmits the axial load to the case,
wherein the seal carriage includes a radially-extending wall that defines an axial face, and the axial face abuts the vane structure, and
wherein the seal carriage includes an axially-extending wall joined with the radially-extending wall, and the radially-extending wall tapers from the axially-extending wall.

20. The gas turbine engine as recited in claim 19, wherein the seal arc segment defines first and second seal supports, and the seal carriage defines first and second support members that are circumferentially spaced apart from each other, the first support member supporting the seal arc segment in a first ramped interface and the second support member supporting the seal arc segment in a second ramped interface such that the seal arc segment is circumferentially moveable with respect to the carriage.

21. The gas turbine engine as recited in claim 20, wherein the seal carriage includes first and second hook members connected to the case, and the first and second hook members are axially spaced apart from each other.

22. The gas turbine engine as recited in claim 21, wherein the seal arc segment includes at least one of a ceramic material or a molybdenum-based alloy.

23. The gas turbine engine as recited in claim 22, wherein the first and second support members are off the load path.

* * * * *